United States Patent [19]

Long

[11] Patent Number: 4,637,940
[45] Date of Patent: * Jan. 20, 1987

[54] ELASTOMER-COATED BIAS REINFORCEMENT FABRIC AND METHOD FOR PRODUCING SAME

[75] Inventor: Delmar D. Long, Rock Hill, S.C.

[73] Assignee: Dayco Corporation, Dayton, Ohio

[*] Notice: The portion of the term of this patent subsequent to Apr. 25, 2001 has been disclaimed.

[21] Appl. No.: 787,830

[22] Filed: Oct. 15, 1985

Related U.S. Application Data

[60] Division of Ser. No. 652,394, Sep. 20, 1984, Pat. No. 4,565,715, which is a division of Ser. No. 533,098, May 16, 1983, Pat. No. 4,490,428, which is a continuation-in-part of Ser. No. 350,969, Feb. 22, 1982, Pat. No. 4,501,771.

[51] Int. Cl.⁴ .............................................. B05D 3/12
[52] U.S. Cl. .................................... 427/176; 427/209; 427/381; 428/110; 474/271
[58] Field of Search ............... 427/176, 209, 322, 381; 474/271; 428/110

[56] References Cited

U.S. PATENT DOCUMENTS

| | | | |
|---|---|---|---|
| 1,323,212 | 11/1919 | Bulley | 156/88 |
| 3,784,427 | 1/1974 | Griffin | 156/139 |
| 3,832,210 | 8/1974 | Rohlfing | 427/176 |
| 4,062,989 | 12/1977 | Long | 427/176 |
| 4,116,159 | 9/1978 | Long | 118/34 |
| 4,205,559 | 6/1980 | Long et al. | 74/233 |
| 4,283,455 | 8/1981 | McGee | 428/240 |

Primary Examiner—James J. Bell
Attorney, Agent, or Firm—Joseph V. Tassone

[57] ABSTRACT

An elastomer coated bias fabric for reinforcing power transmission belts and the like is disclosed wherein one surface of the fabric is provided with an uncured, tacky, elastomeric composition. The fabric is prepared by pre-impregnating the fabric, transversely stretching the fabric on a tenter frame, coating a latex composition on both surfaces of the fabric while maintaining the fabric in its transversely stretched condition, and after drying the fabric, overcoating one surface only of the coated fabric with a tackified, latex composition which may contain a chemical linking agent which enhances the bond between the elastomer and the fabric by forming a chemical bridge between them. A method for manufacturing coated fabric is also disclosed.

1 Claim, 3 Drawing Figures

ELASTOMER-COATED BIAS REINFORCEMENT FABRIC AND METHOD FOR PRODUCING SAME

CROSS REFERENCE TO RELATED APPLICATIONS

This application is a divisional patent application of its copending parent patent application Ser. No. 652,394, filed Sept. 20, 1984, now U.S. Pat. No. 4,565,715, which is a division of 06/533,098 filed 5-16-83, now U.S. Pat. No. 4,490,428, which is a continuation-in-part of 06/350,969, filed 2-22-82, now U.S. Pat. No. 4,501,771.

BACKGROUND OF THE INVENTION

1. Field of the Invention

The present invention relates to elastomer-coated bias fabrics of the type employed as reinforcement in such industrial products as power transmission belts, hoses, tires and the like and, more particularly, to neoprene-coated bias-cut reinforcement fabrics having at least one tacky surface; and to a method for producing the same.

2. Prior Art Statement

Bias-cut fabrics which have previously been coated and impregnated with an uncured, tacky, elastomeric compound, such as a synthetic elastomer, have conventionally been used in the production of power transmission belts, hoses, and the like as a protective cover and reinforcement. It is the common practice to combine the pre-coated bias-cut fabric with the carcass, substrate, or core of the product during the vulcanizing operation, such that heating cures and bonds the fabric to the rubber base of the product.

Elastomer-coated bias-cut fabrics have been the subject of a number of U.S. patents including:

U.S. Pat. No. 1,323,212 (1919) to Bulley
U.S. Pat. No. 3,784,427 (1974) to Griffin
U.S. Pat. No. 3,832,210 (1974) to Rohlfing
U.S. Pat. No. 4,283,455 (1981) to McGee as well as the following U.S. patents to the present inventor:

U.S. Pat. No. 4,062,989 (1977) to Long
U.S. Pat. No. 4,116,159 (1978) to Long
U.S. Pat. No. 4,205,559 (1980) to Long et al Bulley discloses a rubber impregnated bias cut fabric for use in a tire carcass.

Griffin discloses a method and apparatus for manufacturing an elastomer-coated bias cut fabric wherein a tubular woven fabric is cut spirally at a 45° angle to produce a continuous sheet of fabric which is impregnated with a curable binder and transversely stretched on a tenter frame to increase the complementary angle of the warp and weft threads. The binder is cured or otherwise hardened to stabilize the fabric and is subsequently immersion impregnated with an elastomeric composition, such as neoprene dissolved in a solvent, dried, and cut into strips for application to V-belt cores.

McGee discloses a process which parallels that of Griffin wherein the fibers of the fabric are immersed in an elastomeric composition containing a pigment and then coated with another layer of elastomer. The pigment is removed as the edges of the fabric are abraded to reveal the white threads of the fabric which can then be interpretted as a sign of wear.

Rohlfing discloses a bias cut fabric which is manufactured from a tubular fabric woven such that when the fabric is cut on the 45° bias there is a minimum of selvage.

Long '989 discloses a method and apparatus for uniformly coating and impregnating a bias-cut woven fabric with a tacky elastomer. The fabric is coated while the fabric is pantographed on a tenter frame by sequentially applying a viscous elastomeric coating to the lower and upper surfaces of the fabric inwardly of the edges and by smoothing the coatings to a uniform thickness.

Long '559 is directed to a neoprene coating composition useful in the Long '989 process wherein a carboxylated neoprene is tackified with a high boiling aromatic oil.

Long '159 is directed to a coating head for applying viscous coating such as elastomeric latices to a moving woven web. The coating head employs a pair of elongate manifolds extending across the web which simultaneously coat both surfaces of web by extrusion and thereby ensure penetration of the interstices of the fabric by the coating composition.

SUMMARY OF THE INVENTION

In the manufacture of power transmission belts, a reinforcement fabric is fixed to the rubber base of the belt either by bonding the fabric to one surface of the rubber belt body in the case of a raw edge belt, or by wrapping the fabric about the belt body, in the case of a covered belt, and bonding the overlapping pieces of fabric to one another and the fabric itself to the body of the belt. Difficulties have been encountered maintaining positive secure positional attachment of the precoated reinforcement fabric to the rubber base of the belt and especially to the overlapping portions of the fabric itself when preparing the belt for vulcanization. If secure attachment of the precoated fabric to the base and/or its overlapping portions is not maintained, the service life of the belt can be greatly reduced. In particular, if secure attachment is not maintained, the fabric may separate from the base due to poor vulcanization bonding at the interface of the fabric and the body of the belt. For this reason, reinforcement fabric having a highly tacky uncured rubber-coated surface, which securely adheres the fabric to the belt body, has been used in some belt manufactures.

Several problems arise in providing an elastomer coated fabric having a tacky surface. Tackified latices are generally so unstable that they are not amenable to industrial coating. The presence of the tackifying agent apparently interferes with the maintainance of the micelle such that upon the application of shear forces during coating, the micelle breaks down and the latex agglomerates. Somewhat stable latices can be formed when a tacky polymer is mixed with an elastomer, but the coatings which are produced from these latices do not have a high cured adhesion strength.

Relatively stable tackified latices can be prepared from carboxylated elastomers because the carboxyl groups tend to stabilize the micelles. However, the carboxyl groups in these elastomers also react with metal surfaces, such as the surface of a belt mold. As a result, reinforcing fabrics prepared in accordance with Long '989, that are coated on both surfaces with a tackified carboxylated neoprene, are not entirely desirable because the fabric tends to cure to the mold belt, making removal of the product difficult. While one solution to this problem would appear to be to coat the surface of the fabric facing the mold with a non-tacky, non-carboxylated elastomer, reserving the tacky carboxylated elastomer for the surface adjacent the base of the product, due to differences in the physical properties of non-carboxylated and carboxylated elastomers and destabilizing interactions which occur between them, fabric cannot be prepared in that manner. In some cases one or both of the coatings agglomerate during the coating process, and, in others, the coatings which are obtained do not have good adhesion for each other or the fabric. Furthermore, the coatings tend to not fully penetrate the yarn bundles and the interstices of the fabric.

Hereinafter, the present invention will be described with reference to the production of neoprene-coated bias fabrics, however, those skilled in the art will understand that the teachings herein are also applicable to forming coated fabrics using such elastomers as styrene-butadiene rubber, acrylics, nitriles, polyurethanes, vinyl resins, natural rubber, silicones, epoxies, etc., wherein a tacky surface is provided on one surface of the fabric by the application of the corresponding tackified elastomer.

Previously, as described in U.S. application Ser. No. 350,969 filed Feb. 22, 1982, tackified neoprene-coated fabrics which do not cure to the belt mold during vulcanization were obtained by a coating process wherein a non-carboxylated neoprene latex is applied to both surfaces of the bias-cut fabric and dried and thereafter a tackified carboxylated neoprene latex is applied over the dried non-carboxylated neoprene on one surface only of the fabric. By drying the noncarboxylated neoprene latex prior to applying the tackified carboxylated neoprene on one surface of the fabric, the undesirable interactions between the coatings are overcome and a uniform coating of the tacky carboxylated neoprene having good adhesion to the underlying neoprene coating is provided. In addition, by sandwiching the bias cut fabric between two coatings of non-carboxylated neoprene, good penetration of the fiber bundles and fabric interstices is obtained resulting in good fabric to stock cured adhesion.

The present invention provides, as one embodiment, an elastomer-coated bias fabric and, more particularly, a neoprene-coated bias-cut fabric reinforcement, wherein at least one surface of the coated fabric is tacky. The term "bias fabric" as used herein includes plain woven, satin woven, and twill woven fabric which is cut on the bias (so called bias-cut fabric), bias woven fabric, and non-woven fabric in which the yarns or fiber bundles are layed out in a bias orientation.

It has now been found that elastomeric latex compositions containing noncarboxylated elastomers, such as neoprene, are commercially available which provide a sufficiently stable micelle that they can be tackified by the addition of tackifying agents and coated on transversely stretched fabric in accordance with the present invention with good results. Because these tackified noncarboxylated elastomeric latex compositions do not bond to the product mold, they can be applied directly to both surfaces of the fabric, applied to one surface of the fabric, or used as an overcoat on one surface of the fabric.

In addition to finding that a tackified noncarboxylated elastomeric composition can be used in providing a tacky surface on the fabric, it has also been found that it is not necessary to pre-impregnate the fabric with a composition containing an elastomer as disclosed in U.S. application Ser. No. 350,969. Pre-impregnation performs two essential functions. It lubricates the yarns or fiber bundles so that the fabric can be more easily stretched and it enhances impregnation of the fabric (i.e., the yarns or fiber bundles and the interstices) by the elastomer. In accordance with the present invention, the fabric may be pre-impregnated with a non-elastomeric liquid composition which fulfills these functions without stabilizing or fixing the position of the yarns or bundles in the fabric. In accordance with one embodiment of the invention, water alone can be used to pre-impregnate the fabric. These liquid compositions adequately lubricate the fabric to facilitate stretching and provide good impregnation by the elastomer.

Thus, one embodiment of the present invention is a method for manufacturing elastomer-coated bias fabric which comprises:

a. transversely stretching a bias fabric having yarns or fiber bundles and interstices between said yarns or fiber bundles, b. applying an elastomeric latex composition to both surfaces of said fabric while said fabric is maintained transversely stretched such that said composition substantially penetrates the interstices of said fabric and provides an elastomeric coating of substantially uniform thickness, and, c. drying said coated latex composition; wherein the improvement resides in pre-impregnating said fabric, prior to said stretching with a liquid non-elastomeric composition which facilitates the impregnation of said fabric by said elastomer but does not stabilize the orientation of said yarns or fiber bundles in said fabric.

In accordance with a preferred method, the aforesaid elastomeric composition on one side of the fabric is overcoated with a tackified elastomeric composition, such as a noncarboxylated elastomeric composition, and said overcoat is subsequently dried.

Another embodiment of the present invention resides in an elastomer-coated bias fabric which comprises:

a bias fabric having opposed surfaces, yarns or fiber bundles, and interstices between said yarns or fiber bundles, a layer of an uncured elastomeric composition coated on both surfaces of said fabric and penetrating said yarns or fiber bundles and said interstices, a tackifying agent present in one of said layers of said uncured elastomeric composition or in a separate layer of an uncured elastomeric composition overlying one of said layers on one surface of said fabric wherein the improvement resides in incorporating said tackifying agent in a composition of a non-carboxylated elastomer.

In accordance with the preferred embodiment of the present invention the aforesaid tackifying agent is incorporated in a separate layer of elastomer overlying a layer of elastomer applied directly to the fabric.

In accordance with a still more preferred embodiment of the present invention, a chemical linking agent is provided in the aforesaid elastomeric composition wherein said linking agent reacts with the fabric and the elastomer and forms a chemical bridge which bonds the elastomer to the fabric.

DESCRIPTION OF THE PREFERRED EMBODIMENTS

Figure 1:
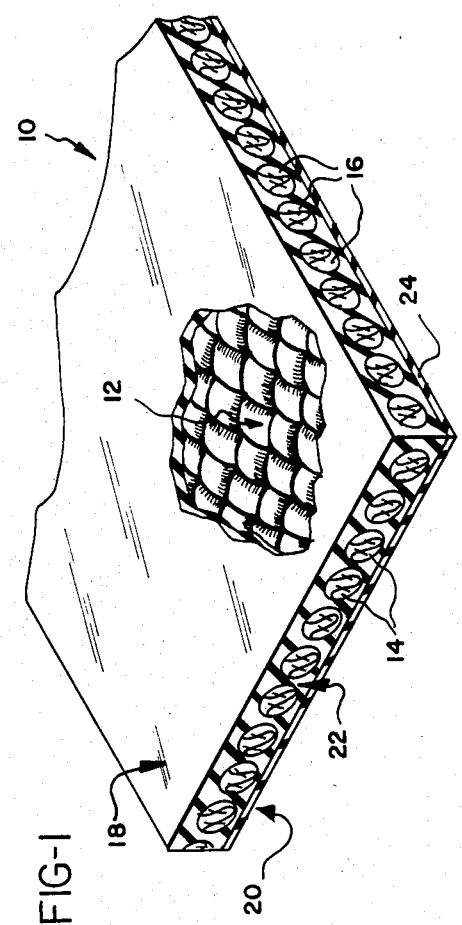
FIG. 1 is a cross-sectional elevational view of one embodiment of the elastomer-coated bias fabric of the present invention.

Referring to FIG. 1, the elastomer-coated bias fabric of the present invention 10 comprises a bias fabric 12 which is transversely stretched such that the angle between the warp threads 14 and the weft threads 16 is greater than 90°. While FIG. 1 illustrates a woven fabric, it should be understood that non-woven fabrics can also be used in the present invention. Preferably, the warp and weft threads or the primary fiber bundle or yarn orientations in the case of non-woven fabrics are at an angle of about 100° to 170° and more preferably 100° to 140°. The exact angle used will depend on the nature of the fabric and the weave. For example, a plain weave is usually stretched up to an angle of 140°, satin up to 170° and twill up to 150°. The upper surface 18 and the lower surface 20 of the fabric 12 are coated with an elastomeric composition 22. Elastomeric composition 22 is a non-carboxylated elastomer. Elastomeric composition 22 penetrates the yarn bundles in the fabric 20. In the embodiment shown in FIG. 1, the elastomeric composition on the lower surface 20 of the fabric 12 is overcoated with a layer of a tackified elastomeric composition 24.

The bias fabric 12 may be a bias-cut fabric such as is conventionally used as a reinforcement fabric in the manufacture of power transmission belts, hoses and the like. The fiber content, weight and yarn size, as well as the fabric construction, can be varied to meet the specific requirements of a particular end use. For example, the fiber content may vary from 100% cotton to 100% polyester with blends therebetween. One often used fabric construction, particularly in belt manufacture, is an 8 ounce, 50% cotton-50% polyester fabric having a 35 by 35 count construction.

The fabric is most conveniently prepared by cutting a plain woven tubular fabric on a 45° bias. This provides a flat structure of a specific width which depends on the tube circumference on a continuing basis. Although certainly not as convenient, the fabric may also be prepared by bias cutting a plain woven fabric sheet and seaming the panels obtained along the uncut ends in a manner which is also well known.

Figure 3:
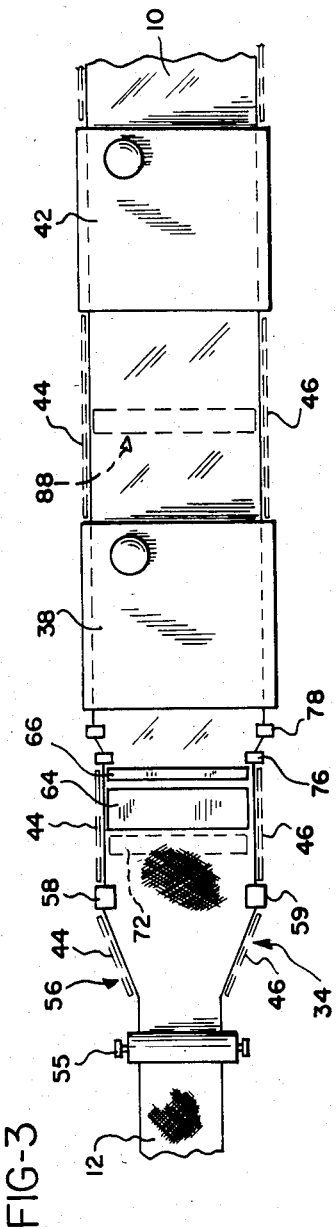
FIG. 3 is an overhead plan view of the coating and tenter frame portions of the apparatus of FIG. 2.
Figure 2:
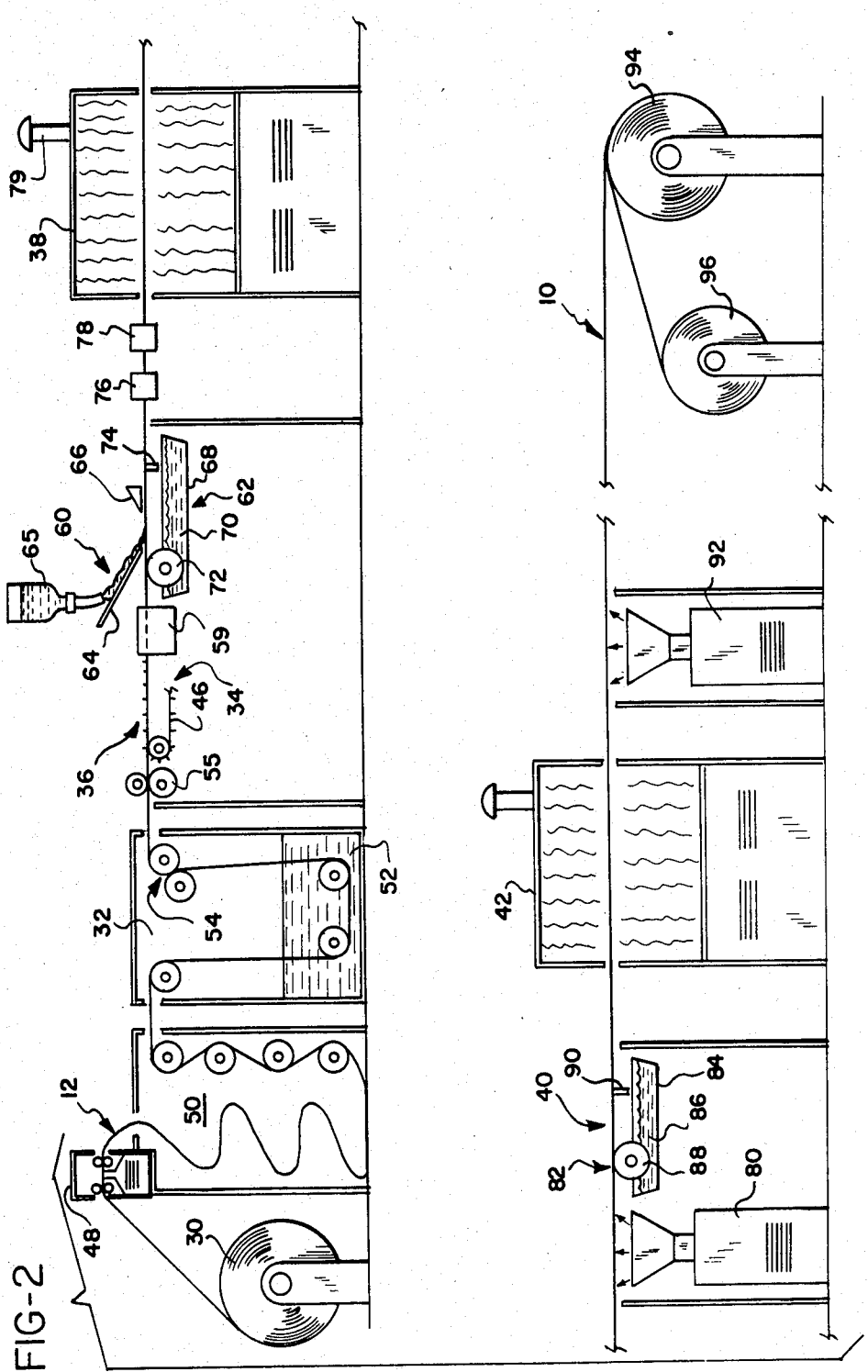
FIG. 2 is a side elevation, diagramatic view of an apparatus for producing elastomer-coated bias fabric in accordance with the present invention.

The elastomer-coated bias-cut fabric of the present invention can be manufactured using the apparatus and method illustrated in FIGS. 2 and 3.

Referring more particularly to FIG. 2 of the drawings, an indefinite length sheet of bias woven fabric is continuously supplied for treatment from a supply source, such as a roll 30. The bias-cut fabric may be provided, in a known conventional manner, by spirally cutting a tubular woven fabric at an angle of approximately 45° to provide a continuous sheet of fabric having warp and weft threads disposed at right angles to each other and at 45° angles to the longitudinal axis of the sheet.

The apparatus as seen in FIG. 2 generally includes a pad 32, a tenter frame 34, an overfeed 55, a first coating station 36, a drying tunnel 38, a second coating station 40 and a drying tunnel 42. The tenter frame 34 is a conventional type well known in the art having spaced, moving chains, indicated schematically by dashed lines 44, 46 (FIG. 3), which are provided with pins for supportably engaging the edges of the fabric to transport the fabric through the tenter frame. Sections of chains in the tenter are angularly adjustable to stretch the fabric in widthwise direction during its movement through the tenter.

As the bias-cut fabric 12 moves from supply roll 30 to the pad 32 it may be cleaned using a vacuum 48 and collected in a scray 50 prior to enterring the pad.

In pad 32, the fabric 12 is impregnated with a composition, which lubricates the yarns and facilitates stretching and impregnation, as it passes through bath 52. In the invention process, pre-impregnation affects a number of conditions including the yarn condition, the penetration of the yarn or fiber bundles by the elastomer, the thread angles and orientation, all of which contribute to providing a satisfactory and reproducible product. The padding process also assists in removing excess warp sizing from the fabric.

The padding bath used in accordance with certain embodiments of the present invention is a non-elastomeric liquid which lubricates the fiber bundles or yarns forming the fabric without stabilizing the yarn or fiber bundle orientations. The bath may consist of water. Preferred bath compositions are aqueous solutions containing a wetting agent, a fiber lubricant, a softening agent, or a combination thereof. Wetting agents improve the wettability of the fiber by reducing surface tension. One example of a suitable wetting agent is a mixture of methanol and butanol as described in U.S. Pat. No. 3,961,889 to Birch et al. Fiber lubricants are used to enhance fiber-to-fiber slippage and thereby facilitate stretching. A typical example is a polyhydric alcohol such as glycerol or a copolymer of glycerol and maleic anhydride as described in U.S. Pat. No. 3,981,836 to Dangle et al. Softening agents improve fiber bending modulus. Typical examples include fatty acid esters, sulfonated castor oil, and methylated polyoxyalkalene carbonates. Foam reducers are also useful to improve impregnation.

In accordance with other embodiments of the present invention, not characterized by the use of a non-elastomeric impregnation, the pad bath may be a low viscosity elastomeric latex as described in U.S. application Ser. No. 350,969.

As the fabric leaves the dip tank in pad 32 it passes through a mangle 54 where the total wet pickup is reduced. The fabric 12 is next overfed in a conventional manner such as by overfeed rolls 55 onto the first section of the tenter frame where the edges of the fabric are supportably engaged by the pins of the traveling chains 44 and 46 of the tenter. The purpose of placing the fabric onto the pins in an overfeed condition is to provide the necessary slack as the fabric is pulled in the transverse direction. The chains in the first section 56 are angularly adjusted about pivot points 58, 59 (FIG. 3) to stretch the fabric in the widthwise direction during its longitudinal movement and thereby increase the angular relationship of the warp and weft threads of the fabric by the desired amount. Typically, in the production of woven fabrics for V-belt construction, the fabrics may be stretched in the first section of the tenter frame to increase the angle between the warp and weft threads or the yarn or fiber bundles from about 90° to approximately 120°. The rate of the overfeed of the fabric and the angular disposition of the tenter chains are coordinated, in a known manner, to impart the desired angular thread relationship to the fabric during stretching. After stretching, the fabric sheet 12 is transported in a stretched condition on the tenter frame in a generally horizontal path through the first coating station 36.

The first coating station 36 comprises a top coater 60 and a bottom coater 62. The top coater 60 comprises a movable chute 64 fed by a latex supply means 65 and a standard doctor blade 66 having on either side thereof and at right angles thereto four inch metal projections which prevent the latex from escaping to the tenter pins. The movable chute 64 is positioned immediately upstream of the doctor blade 66 at a 60° angle to the vertical axis, apexing at the fabric. The purpose of the chute is to minimize the amount of latex on the fabric prior to the doctor blade and thereby provide better control of the latex deposition. Chute 64 is supplied with latex from a conduit 68. The latex flows down the chute and onto the fabric through an elongate slot formed between the chute 64 and the doctor blade 66.

The bottom coater 62 is located immediately upstream of the top coater 60. To simplify the illustration, the bottom coater 62 is shown a distance upstream of top coater 60, however, this distance may be as little as one inch. For that matter, while FIGS. 2 and 3 illustrate a preferred embodiment of the invention, embodiments are envisioned in which the bottom coater is located downstream of the top coater as well as immediately under the top coater for simultaneous coating. It is important that a controlled flood coating of the fabric by the top and bottom coaters is achieved. Furthermore, embodiments are possible in which one of the bottom coater 62 and the top coater 60 is eliminated. In accordance with this modification of the invention, coating composition applied from one side of the fabric is forced through the fabric to the opposite surface where a smooth uniform coating is also formed. Generally, it is more difficult to form smooth uniform coatings by this method.

In FIG. 2, the bottom coater 62 is a roll coater and comprises a trough 68 which is partially filled with coating composition 70 in which a roll 72 rotates under the forward motion of fabric 12. As roller 72 rotates, it carries composition from trough 68 and transfers it to the underside of fabric 12. Downstream of roll 72 is a vertically adjustable scraper bar 74 which doctors the bottom coating and returns the excess composition to the trough. In this manner, the apparatus of FIG. 2 provides a so-called controlled flood coat wherein the pre-impregnated and pantographed fabric is under coated, top coated and scraped from the underside all within the dimension of trough 68. This assures that the upper and lower coatings contact through the interstices of the fabric and provides a more intimate bonding of the coatings to the fabric and of the fabric to the product rubber base.

The coating composition applied at coaters 60 and 62 generally has a viscosity of about 300 to 2000 cps. The viscosity used will depend on the properties of the coating composition (generally its thixotropy) and the construction of the fabric so as to obtain good penetration of the interstices of the fabric and a smooth and uniform coating.

The amount (dry weight) of elastomeric coating composition applied to the fabric at this stage of the invention process will vary with the fabric construction, e.g., the tightness of the weave and the fabric weight. For a 6 oz., 30×30 fabric the dry coverage for a neoprene composition is about 2.5 oz./sq.yd. On the other hand, for an 8 oz. fabric it is about 3.5 oz./sq.yd. Thus, the coating amount is in part a function of the amount of composition the particular fabric tends to pick up. The coating conditions and amounts are adjusted to obtain a thin uniform coating which fills the interstices of the fabric and just covers the fabric threads whereby good adhesion of the fabric to the product base is obtained.

In FIG. 2 the coated fabric proceeds further into the tenter frame to the second pivot point 76 which is a slightly greater width than at the previous point and from there to a third slightly greater pivot point 78. This assures that the coated fabric is maintained in a tight condition and continues the angular build up in the fabric. Thereafter the fabric passes through a first drying tunnel 38 such as an oven where it is dried. The tunnel is appropriately vented as shown at 79.

Using certain elastomers such as neoprene latices, drying conditions must be carefully controlled to avoid the formation of a skin having a low vapor transmission rate on the surface of the coating. A suitable drying temperature in tunnel 38 is in the range of about 250° F. to below 320° F. At temperatures of 320° F. and above a neoprene composition will cross-link. In accordance with one practice the coatings can be steam-dried.

Upon exiting the drying tunnel 38, the coated fabric 12 passes over an air blower 80 and from there to the second coating station 40. The air blower cools the elastomer coating to a temperature suitable for coating with the tackified elastomer. If the coating is not adequately cooled using an air blower or equivalent means, temperature build up in the coating may cause the subsequently coated elastomeric composition to "skin over" upon contact with the coated fabric and interfere with the formation of a smooth coating having good adhesion.

In the illustrated coating apparatus, the second coating station consists of a bottom coater 82 which may be a roll coater identical or similar to the bottom coater 62 at the first coating station 36. As shown, the bottom coater 82 comprises a trough 84 which is filled with a tackified elastomeric latex 86. A roll 88 is driven by travel of the fabric in its horizontal path and carries latex onto the dried elastomeric coating on the underside of the fabric. Downstream of the roll 88 is another vertically adjustable scraper bar which smoothes the coating as previously discussed.

Coating conditions are adjusted at the bottom coater 82 to apply a relatively thin coat of the tackified elastomer which sits up on the surface of the previously coated elastomeric layer without forcing the tackified elastomeric composition into the fabric. Controlling the deposition of the tackified elastomer in this manner, makes the fabric less difficult to handle than if a thick coating of the tackified composition is applied to the fabric. This places the composition on the surface of the fabric where it is most effective in adhering the fabric to a rubber base member. For this reason the tackified latex composition used in the present invention preferably has a relatively high viscosity, for example, a viscosity on the order of 300 to 4000 cps is used. In general, a tackified elastomer is applied in dry amount of about 1 oz./sq.yd.

While the invention process has been described above with reference to the use of a doctor blade and a roll coater, those skilled in the art will appreciate that equivalent means may be used to apply the respective latices to the top and bottom surfaces of the bias cut fabric. It is important, however, that an applicator means be selected which minimizes the amount of shear to which the latex is subjected so as not to destabilize the latex by disrupting the micelle. Furthermore, preferably applicators are used that apply the latices to the fabric without coating the edges of the fabric which come into contact with the tenter pins.

After being coated with the tackified elastomer, the fabric passes through a second drying tunnel 42 where the elastomer is dried to a tacky state. This operation is not as sensitive as the first drying operation and is typically conducted at temperatures on the order of 225° F. to 275° F. Furthermore, instead of drying the top and bottom of the fabric as shown, only the coated side of the fabric can be dried. The fabric passes from drier 42 over air blower 92. As the fabric emerges from the dryer, the uncoated edges are cut from the fabric by suitable cutting means, such as rotating knives (not shown), and the fabric is collected in a batcher or a simple take off roll 94. To prevent adhesion of the layers of the coated fabric and facilitate handling of the fabric, a sheet of plastic film such as polyethylene, is supplied from a roll 96 to separate the fabric layers. In this regard, blower 92 is used to cool the coated fabric to a temperature sufficiently below the melt point of the polyethylene that the polyethylene can be readily removed from the fabric upon its end use. Preferably the polyethylene is applied as soon as permissible since the polyethylene provides additional support for the fabric. Since the applied elastomeric compositions are dried but not cured, there is a large degree of flexibility in the fabric. This degree of flexibility is one of the desirable features of the fabric. It enables the fabric to more readily conform to the product shape in which it is used. By applying the polyethylene as soon as possible after the fabric leaves the tenter frame, undesirable movement of the yarns (e.g., necking down) can be prevented.

While the method of the present invention has been described with respect to the embodiment of the invention in which a tackified elastomeric overcoat is provided, it will be appreciated that with certain noncarboxylated elastomers, the tackified composition can be applied to the surface of the fabric directly after pre-impregnation with an elastomeric material in the padd bath or with a non-elastomeric padd bath as described above.

In general, the elastomeric compositions used in the present invention are designed to provide a medium cure rate and to provide a uniform coating which penetrates the yarn bundles and fills the interstices of the fabric. The elastomeric latex compositions used in the present invention may be formulated from commercially available components employed in elastomeric adhesive systems such as cross-linking agents, emulsification aids, antioxidants, catalysts, thickeners, lubricants, fillers, and the like depending on the coating properties desired and the particular end use. A commercially available neoprene latex from which it is convenient to formulate a neoprene latex composition for use in the present invention is DuPont Latex 654. This latex contains about 60% solids and can be used in formulating both the tackified and non-tackified coating compositions. Either a sulfur reactive system or a metallic oxide reative system can be used as a curing agent.

A number of tackifying agents and techniques can be used to form tackified elastomeric compositions. For example, compositions can be tackified by the addition of a high boiling aromatic oil as disclosed in U.S. Pat. No. 4,205,559. The preferred means of tackifying the copolymer, however, is to add to the copolymer a tacky resin or rosin. Preferred tackifying agents of the latter type are rosins such as Aquatac 8005, a tall oil rosin manufactured by Sylvachem Corp., Panama City, Fla.

The elastomeric system applied to the fabric preferably contains a chemical linking agent which reacts chemically with the fabric and the elastomer to form a chemical bridge between them, which bonds the elastomer to the fabric. In most cases fabrics such as cotton and polyester fabrics contain reactive groups such as carboxyl, hydroxyl, amino or amido groups which participate in forming various chemical bonds used in binding dyes and other reactive substances to the fabric. In accordance with this embodiment of the present invention, these reactive groups are used to bond the elastomer to the fabric using a chemical linking agent which reacts with the fabric groups and the elastomer to form a bridge between them. The chemical linking agent used most often in the present invention is melamine-formaldehyde, but other agents such as urea-formaldehyde and carbamates could also be used. These agents are frequently encountered in the textile art as yarn stabilization agents.

In accordance with the present invention, it is important that the chemical linking agent be isolated from the fabric until the fabric has been employed in a product such as a power transmission belt. This is because the chemical linking agent is reactive with the fabric, and, if it reacts with the fabric prematurely (e.g., during the coating operation or prior to curing the fabric into the final product), it stabilizes or fixes the yarn orientation in the fabric and makes the fabric relatively stiff, less flexible, and less able to conform to the shape of the product. Premature reaction of the linking agent with the elastomer is not a problem, as commercial latices are chemically blocked until they are heated to their cure temperature. One advantage which the fabric of the present invention has over a fabric such as that prepared in accordance with the teachings of U.S. Pat. No. 3,784,427 is that it is more flexible and conformable to the product. One of the main reasons for this is that in the present invention the yarns or fiber bundles in the fabric are not completely fixed or locked into position until the fabric is cured into the product.

The chemical linking agent can be added to one or all of the elastomeric compositions. If it is added to the elastomeric composition applied directly to the fabric, the elastomer must sufficiently isolate the linking agent from the fabric that there is not an undesirable loss in flexibility. To an extent, this can be controlled by limiting the amount of linking agent added to the elastomer. It is preferred, however, to add the chemical linking agent to the overcoated elastomeric composition since here it is more effectively isolated from the fabric. In this case, upon heating the fabric to cure the fabric into the desired product, the linking agent migrates to the fabric where it reacts with the fabric and the elastomer to form the desired bond.

The amount of chemical linking agent used depends on the nature of the agent, the fabric and the elastomer and whether it is added to an overcoat layer. Typically, the linking agent is used in an amount of 5 parts per hundred parts rubber.

In the manufacture of fabrics for reinforcing power transmission belts, it has been found desirable to incorporate polyethylene in the elastomeric latex composition found on the surface of the belt as a lubricant to control the frictional coefficeint of the belt. The polyethylene used has a relatively low melt index such that as the belt heats up the polyethylene melts and gradually migrates to the surface of the belt where it is able to reduce the coefficient of friction. This is important because if the coefficient of friction becomes too high as the belt is run, the belt will grab the sheave in which it runs and the belt will break upon a sudden start up or stop. By incorporating polyethylene in the fabric coating, the polyethylene will continuously lubricate the surface of the belt. The amount of polyethylene used in the compositions will vary with the frictional properties desired. Polyethylenes having a melt point greater than about 215° F. up to about 285° F. are suitable for use in the present invention.

The invention is illustrated in further detail by the following example of a process for forming neoprene-coated, bias-cut fabric.

EXAMPLE

An 8 oz./sq.yd. tubular woven fabric composed of 50% cotton-50% polyester threads having a 35×35 count construction was spirally cut on a 45° angle to produce a continuous sheet of woven fabric in which the warp and weft yarns were disposed at 90° angle to each other. The fabric was fed to a pad tank containing Latex Formulation A below and into the pad. The components of the latex formulation are listed in the order of their addition for compounding.

| Latex Formulation A | lbs/100 gal. mix |
|---|---|
| Water | 511 |
| Latex 654 (60% solids neoprene latex available from E. I. DuPont de Nemours Wilmington, Delaware | 195 |
| Antioxidant (Wing-Stay-L dispersion, The Goodyear Tire and Rubber Co., Akron, Ohio) | 5 |
| KD 40 (zinc oxide) | 10 |
| Sulfur | 1 |
| Fabritone PE (Polyethylene, melting point: about 219° F.) | 86 |
| Carbon Black (Monocol 20-72 Mono Chem Corp., Atlanta, Texas)[1] | 57 |

[1]In fabrics for V-belt manufacture, the neoprene latex compositions contain carbon black as an antistatic agent.

The nip pressure was adjusted such that the total wet pick up in the pad did not exceed 80%.

The fabric was thereafter continuously overfed up to 50% onto a tenter frame and stretched in the first zone to produce a thread angle of approximately 120°. The stretched fabric was passed on the tenter frame through the coating apparatus shown at the first coating station in FIGS. 2 and 3 where the following Latex Formulation B was applied to the top and bottom surfaces. Again, the components are listed in the order of their addition upon compounding.

| Latex Formulation B | lbs/100 gal. mix |
|---|---|
| Water | 327 |
| Dupont Latex 654 | 297 |

| Latex Formulation B | lbs/100 gal. mix |
|---|---|
| Antioxidant (as in Formulation A) | 7 |
| KD 40 | 15 |
| Sulfur | 2 |
| Polyethylene (same as in Latex Formulation A) | 61 |
| Carton Black (Monocol 20-72) | 149 |
| Polyacrylate thickener (Paragum 131 Parachem Corp.) | 36 |

After coating, the fabric was dried to a nonflowable state by passing it through an oven set at 290° F. Upon exiting the oven the fabric was cooled to about 200° F. by blowing air over the fabric. The fabric was then coated with the following Latex Formulation C, a tackified, carboxylated neoprene latex, using a roll coater and scraper bar as shown in FIGS. 2 and 3.

| Latex Formulation C | lbs/100 gal. mix |
|---|---|
| Hot Water 135° F. | 141 |
| KD 40 | 21 |
| Sulfur | 3 |
| KD 4 (Antioxidant) | 8 |
| Tall oil | 316 |
| DuPont Latex 654 | 358 |
| Carbon Black (Monocol 20-72) | 38 |

This coating was subsequently heated to 250° F. in an oven and dried to a nonflowble tacky state. Upon leaving the oven the uncoated edges of the fabric were removed and the fabric collected with a separation sheet of polyethylene in roll form. A very supple fabric good for use in manufacturing wrapped molded belts was obtained.

Having described the invention in detail and by reference to preferred emobodiments thereof, it will be apparent that modifications and variations are possible without departing from the scope of the appended claim.

What is claimed is:

1. In a method for manufacturing elastomer-coated, bias fabric comprising:
   a. transversely stretching a bias fabric having opposed surfaces, yarns, or fiber bundles, and interstices between said yarns or fiber bundles,
   b. applying an elastomeric latex composition to both surfaces of said fabric while said fabric is maintained transversely stretched, such that said composition substantially penetrates the interstices of said fabric and provides an elastomeric coating of substantially uniform thickness, and
   c. drying said coated latex composition, the improvement which comprises:
   prior to stretching said bias fabric, pre-impregnating said bias fabric with a liquid non-elastomeric composition which facilitates the impregnation of said fabric by an elastomer but does not stabilize the orientation of said yarns or bundles in said fabric, said liquid non-elastomeric composition comprising water and an impregnation facilitating agent disposed in said water.

* * * * *